(12) United States Patent
Sakuragi et al.

(10) Patent No.: US 11,770,054 B2
(45) Date of Patent: Sep. 26, 2023

(54) MOTOR

(71) Applicant: MINEBEA MITSUMI Inc., Nagano (JP)

(72) Inventors: Katsunori Sakuragi, Kitasaku-gun (JP); Yoshihito Fujie, Kitasaku-gun (JP); Masahiko Anko, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 31 days.

(21) Appl. No.: 17/451,505

(22) Filed: Oct. 20, 2021

(65) Prior Publication Data

US 2022/0140707 A1    May 5, 2022

(30) Foreign Application Priority Data

Oct. 30, 2020 (JP) ................. 2020-182862

(51) Int. Cl.
| | |
|---|---|
| *H02K 11/33* | (2016.01) |
| *H02K 11/30* | (2016.01) |
| *H02K 1/04* | (2006.01) |
| *H02K 5/16* | (2006.01) |

(52) U.S. Cl.
CPC ............ *H02K 11/33* (2016.01); *H02K 1/04* (2013.01); *H02K 5/16* (2013.01); *H02K 11/30* (2016.01); *H02K 2203/03* (2013.01)

(58) Field of Classification Search
CPC .......... H02K 3/34; H02K 3/345; H02K 11/33; H02K 11/30; H02K 3/50; H02K 3/52; H02K 5/225; H02K 3/522; H02K 5/16; H02K 1/04; H02K 11/0094; H02K 2203/03
USPC .......................................... 310/214, 215, 71
See application file for complete search history.

(56) References Cited

U.S. PATENT DOCUMENTS

| | | | |
|---|---|---|---|
| 6,278,248 B1 | 8/2001 | Hong et al. | |
| 2011/0067945 A1* | 3/2011 | Sonoda | B62D 5/0409 180/444 |
| 2015/0130332 A1 | 5/2015 | Sakai et al. | |
| 2017/0302127 A1* | 10/2017 | Sakuragi | H02K 5/04 |
| 2018/0219460 A1* | 8/2018 | Shiozawa | H02K 11/33 |
| 2019/0003485 A1* | 1/2019 | Nogamida | F04D 25/0606 |
| 2019/0131845 A1 | 5/2019 | Sakauragi et al. | |
| 2020/0006991 A1* | 1/2020 | Yamagata | H02K 1/278 |
| 2020/0373795 A1* | 11/2020 | Yamamoto | H02K 3/522 |

FOREIGN PATENT DOCUMENTS

| | | |
|---|---|---|
| JP | H08-140325 A | 5/1996 |
| JP | 2001-128432 A | 5/2001 |
| JP | 2015-095920 A | 5/2015 |
| JP | 2019-083611 A | 5/2019 |

* cited by examiner

*Primary Examiner* — Alexander A Singh
(74) *Attorney, Agent, or Firm* — Pearne & Gordon LLP

(57) ABSTRACT

A motor includes a rotor, a stator, a first substrate, a second substrate, and an electronic component arranged at the second substrate. The stator includes a stator core, an insulator, and a coil wound around the stator core via the insulator. The insulator includes a coupling part connected to an external device. The first substrate is fixed to the insulator. The second substrate is fixed to the first substrate. The first substrate and the second substrate are spaced apart in a rotation axis direction of the rotor.

18 Claims, 7 Drawing Sheets

MOTOR

CROSS-REFERENCE TO RELATED APPLICATIONS

This application claims the benefit of Japanese Application No. 2020-182862, filed Oct. 30, 2020, the entire disclosure of which is hereby incorporated herein by reference.

TECHNICAL FIELD

The present invention relates to a motor.

BACKGROUND ART

There is known a technique concerning a motor operating with alternating current (AC) power, and in this technique, a brushless motor including an AC-DC converter is used in order to meet a demand for an increased service life and reduced noise.

CITATION LIST

Patent Literature

Patent Document 1: Japanese Patent Application Laid-open No. 2001-128432
Patent Document 2: Japanese Patent Application Laid-open No. 2015-95920
Patent Document 3: Japanese Patent Application Laid-open No. H08-140325
Patent Document 4: Japanese Patent Application Laid-open No. 2019-83611

SUMMARY OF INVENTION

Technical Problem

For a direct current motor including an AC-DC converter, more weight reduction and size reduction are desired.

An object of one aspect is to provide a motor capable of achieving weight reduction and noise reduction.

Solution to Problem

In one mode, a motor includes a rotor, a stator, a first substrate, a second substrate, and an electronic component arranged at the second substrate. The stator includes a stator core, an insulator, and a coil wound around the stator core via the insulator. The insulator includes a coupling part coupled to an external device. The first substrate is fixed to the insulator. The second substrate is fixed to the first substrate. The first substrate and the second substrate are spaced apart in a rotation axis direction of the rotor.

With the one mode, it is possible to achieve the weight reduction and noise reduction.

DESCRIPTION OF EMBODIMENTS

Figure 1:
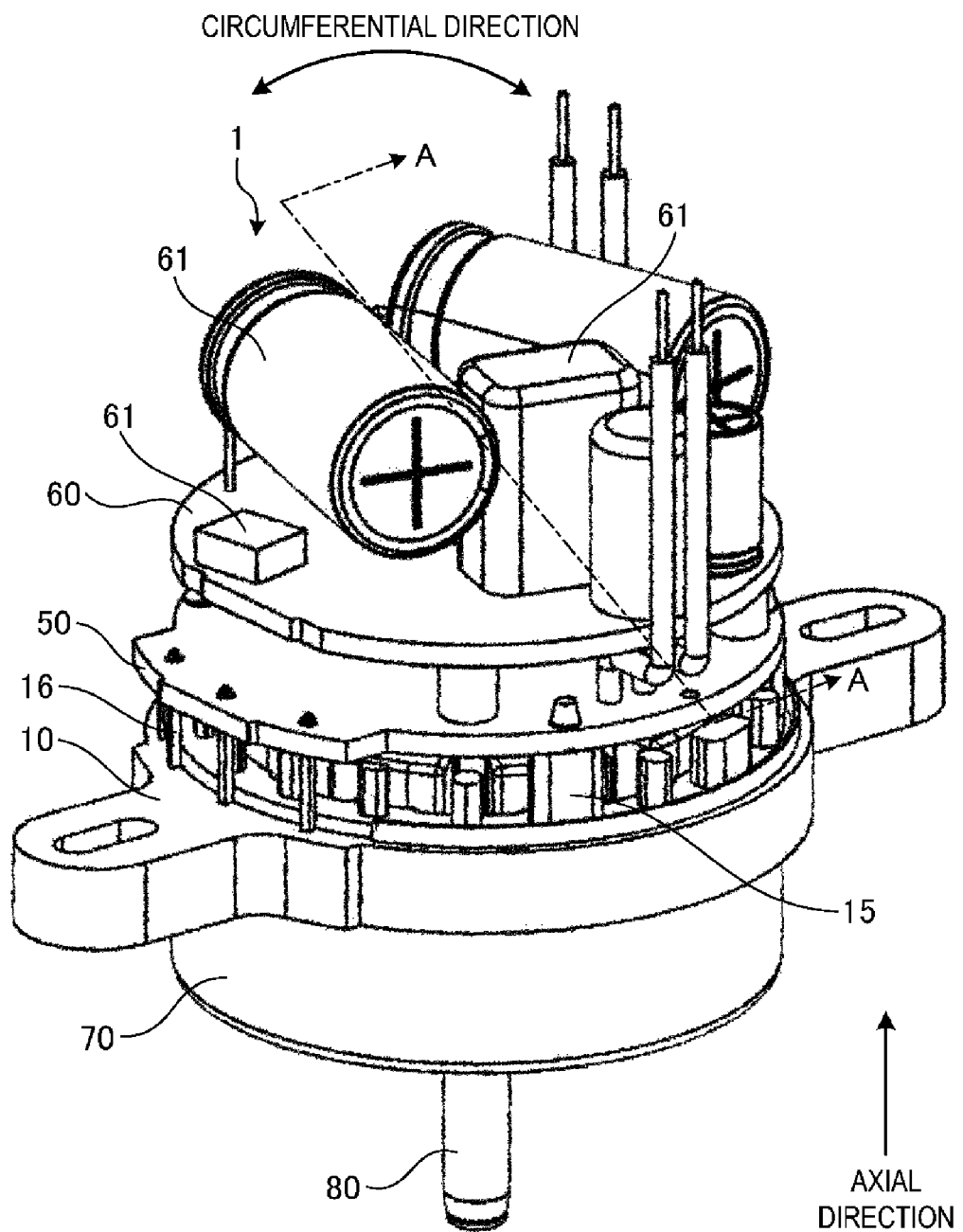
FIG. 1 is a perspective view illustrating one example of a motor according to a first embodiment.

An example of a motor disclosed in the present application will be described below in detail with reference to the drawings. Note that the dimensional relationships, the proportions, and the like between elements in the drawings may differ from those in reality. Among the drawings, the dimensional relationships and proportions may not necessarily be the same. In each of the drawings, a coordinate system including at least any one of an axial direction (rotation axis direction of a motor 1), a radial direction, or a circumferential direction of the motor 1, which will be described later, may be illustrated for the purpose of facilitating explanation. In addition, the rotation axis direction of the motor 1 may be simply referred to as an "axial direction" below.

Figure 2:
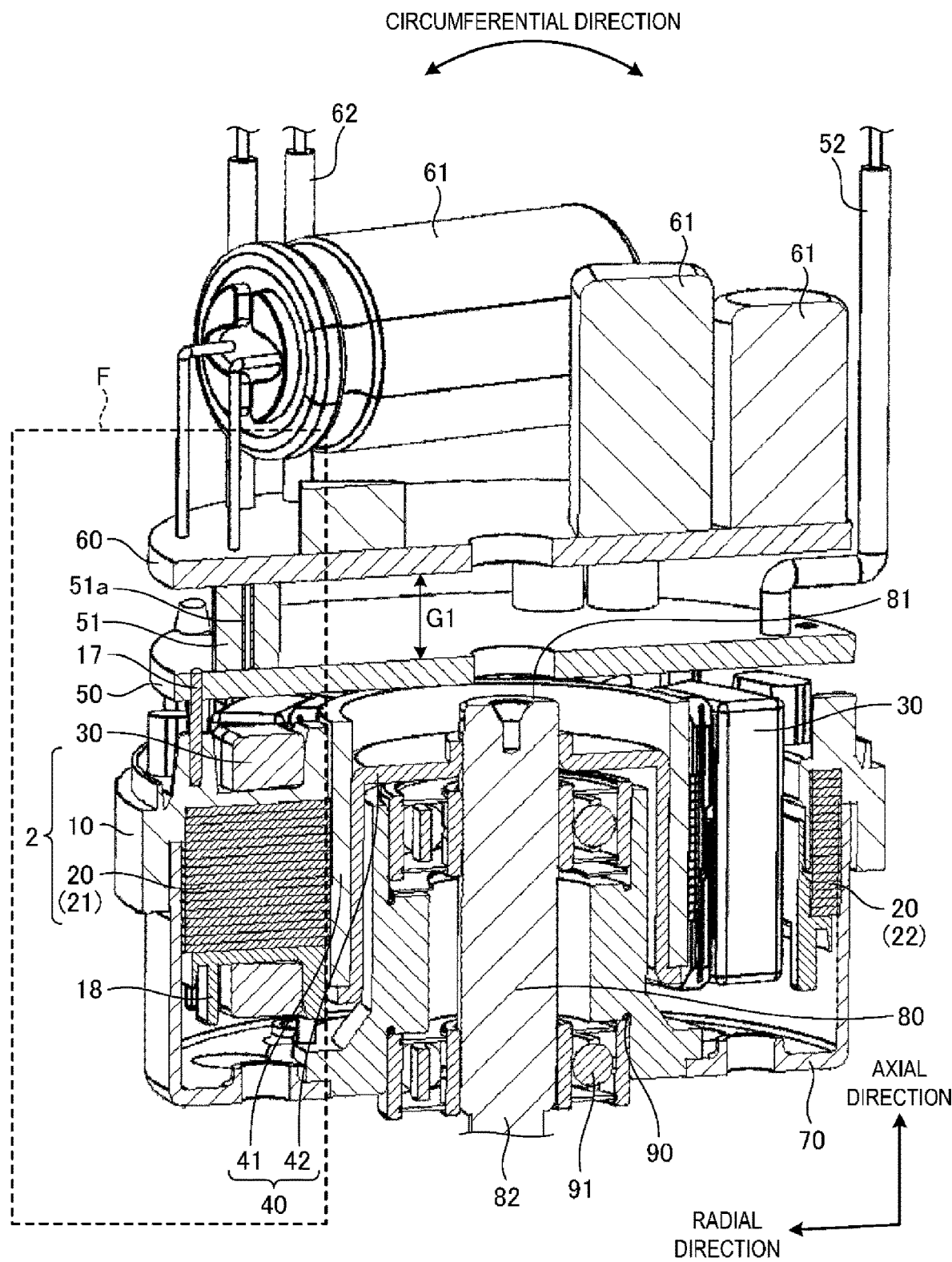
FIG. 2 is a cross-sectional view illustrating one example of the motor according to the first embodiment.
Figure 3:
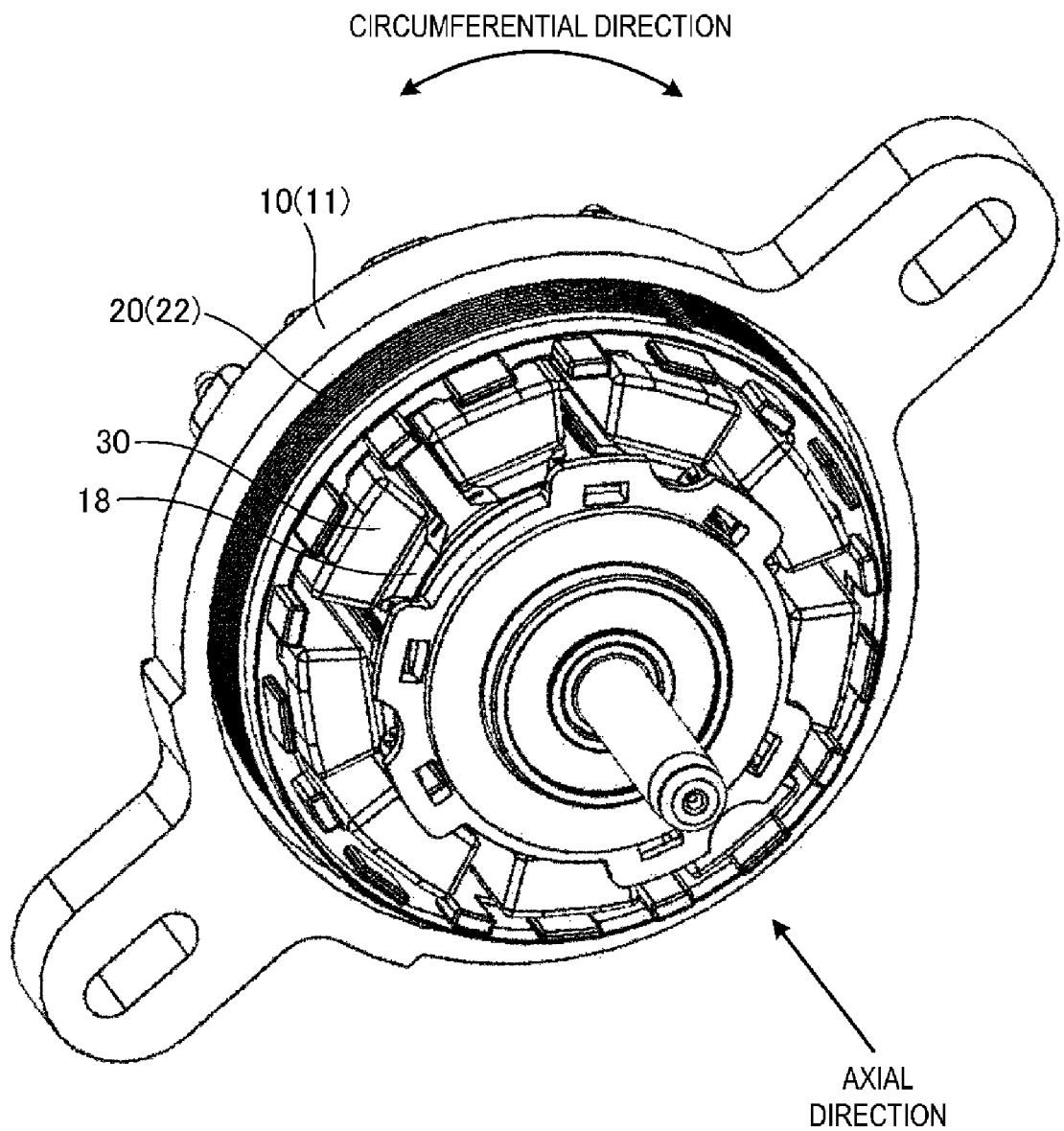
FIG. 3 is a perspective view illustrating the motor according to the first embodiment, and in this view, a housing of the motor is removed.

FIG. 1 is a perspective view illustrating one example of a motor according to a first embodiment. FIG. 2 is a cross-sectional view illustrating one example of the motor according to the first embodiment. FIG. 3 is a perspective view of the motor according to the first embodiment. In FIG. 3, a housing of the motor is removed. FIG. 2 illustrates a cross section taken along the line A-A in FIG. 1. As illustrated in FIGS. 1 to 3, the motor 1 according to the present embodiment includes a stator 2, a rotor 40, a first substrate 50, a second substrate 60, a housing 70, a shaft 80, and a bearing housing 90. The stator 2 includes an insulator 10, a stator core 20, and a coil 30.

In the present embodiment, the insulator 10 is formed with an insulating member such as resin. The stator core 20 is configured, for example, by stacking, in the axial direction, a predetermined number of steel sheets formed of a magnetic substance such as a silicon steel sheet. The stator core 20 includes a teeth part 21 protruding in the radial direction, and a core back 22 extending in the circumferential direction. The coil 30 is wound around the stator core 20 via the insulator 10.

The coil 30 includes, for example, a winding line such as a copper line. For example, the rotor 40 includes a magnet 41 such as a neodymium magnet, and a yoke 42 serving as a magnetic body.

In the present embodiment, the first substrate 50 is, for example, a driver circuit configured to control operation of the motor 1. The second substrate 60 receives alternating current (AC) power supplied from the outside, and supplies direct current (DC) power to the motor 1.

The housing 70 is formed of metal such as steel, and accommodates the stator 2. The shaft 80 includes an end part 81 opposing to the first substrate 50 in the axial direction and disposed at an upper direction side in the drawing, and an output-side end part 82 disposed at a lower direction side in the drawing. The shaft 80 is inserted into the bearing housing 90.

Figure 4:
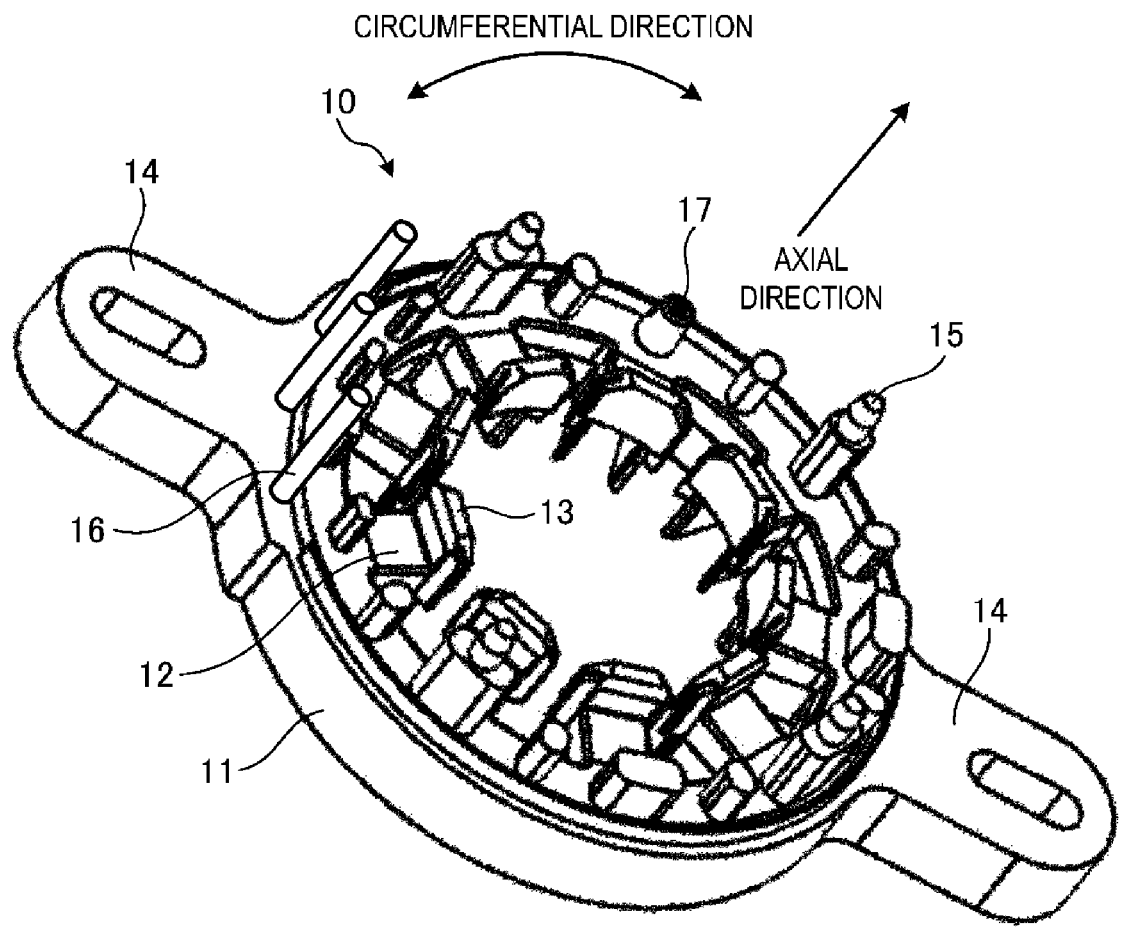
FIG. 4 is a perspective view illustrating one example of an insulator according to the first embodiment.

FIG. 4 is a perspective view illustrating one example of the insulator according to the first embodiment. As illustrated in FIG. 4, the insulator 10 includes an outer circumference part 11, a connecting part 12, an internal circumference part 13, and coupling parts 14. In addition, at an upper side in the axial direction, the insulator 10 further includes a fixing part 15, a first conductive member 16, and a second conductive member 17, as illustrated in FIG. 4.

For example, the insulator 10 is mounted at the stator core 20 from above in the axial direction, as illustrated in FIG. 2. Note that the insulator 10 may be configured by, for example, being combined with a lower insulator 18 mounted at the stator core 20 from below in the axial direction, as illustrated in FIG. 2.

As illustrated in FIGS. 2 to 4, the outer circumference part 11 of the insulator 10 opposes to the core back 22 of the stator core 20 in the axial direction. In addition, the connecting part 12 of the insulator 10 opposes to the teeth part 21 of the stator core 20 in the axial direction. The coil 30 is wound around the teeth part 21 via the connecting part 12.

The internal circumference part 13 of the insulator 10 has an outer side surface in the radial direction opposing to the coil 30. In addition, the inner side surface of the internal circumference part 13 in the radial direction opposes to the bearing housing 90.

Each coupling part 14 of the insulator 10 extends outwards in the radial direction from the outer circumference part 11 of the insulator 10. The coupling parts 14 are coupled to a casing 3 not illustrated in FIGS. 1 to 4, and the motor 1 is mounted at the casing 3. Note that the casing 3 serves as one example of the external device.

As illustrated in FIG. 1, the insulator 10 includes the two coupling parts 14 opposing to each other in the radial direction. Note that the present embodiment describes the insulator 10 including the two coupling parts 14. However, the number of the coupling parts 14 is not limited to this number. For example, the insulator 10 may include only one coupling part 14, or may include three or more coupling parts 14.

Figure 5:
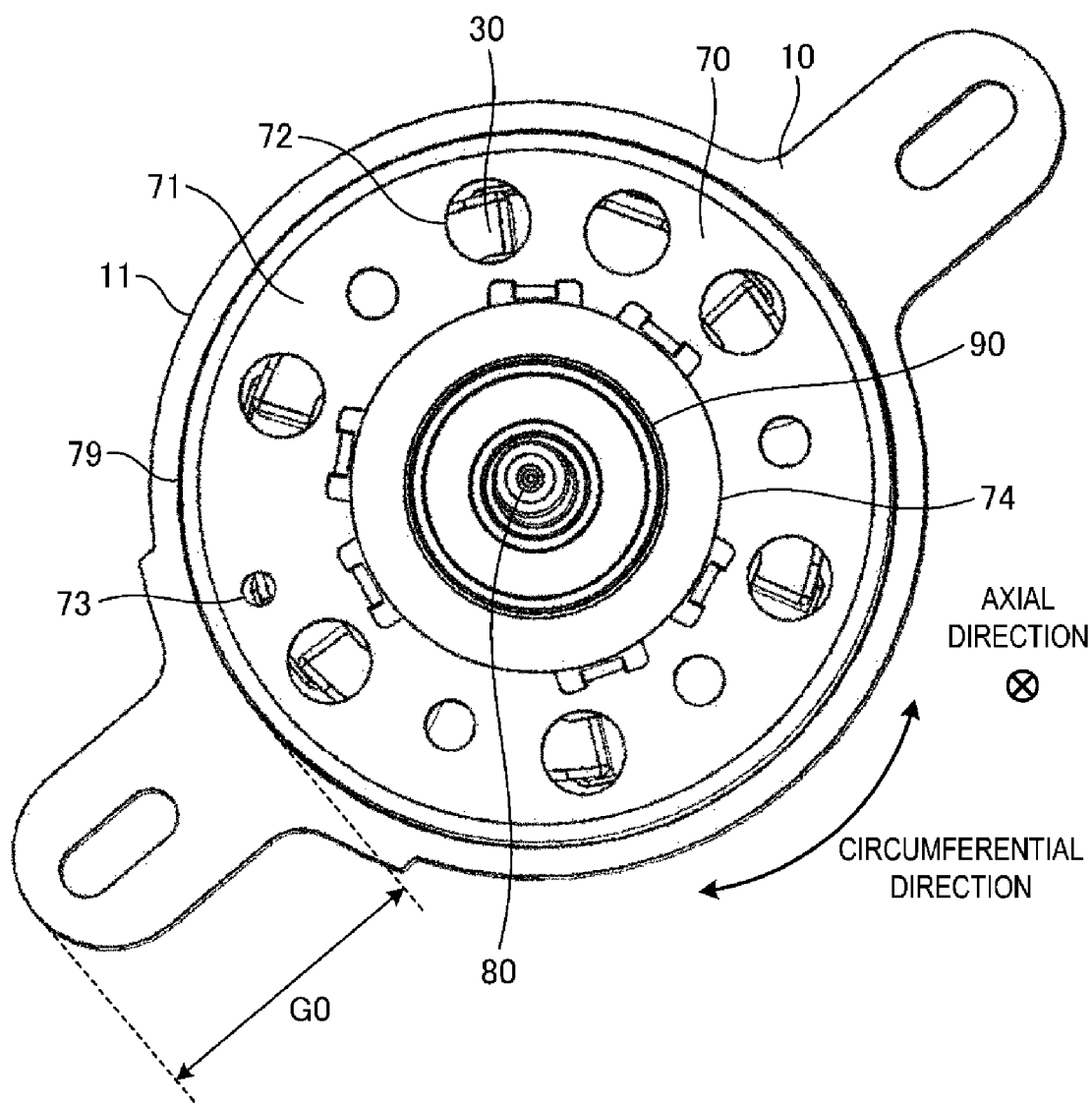
FIG. 5 is a bottom view illustrating one example of the motor according to the first embodiment.

In the present embodiment, as illustrated in FIG. 1, the motor 1 and the casing 3 are coupled to each other by the coupling parts 14 provided at the insulator 10 formed of a resin material, not by an attachment part formed at the housing 70. FIG. 5 is a bottom view illustrating one example of the motor according to the first embodiment. As illustrated in FIG. 5, a gap G0 is formed between a tubular part 79 of the housing 70 and each coupling part 14 of the insulator 10. This makes it possible to reduce the size of the housing 70 formed of metal. Thus, it is possible to reduce the weight of the motor 1. In addition, the coupling parts 14 are formed at the insulator 10 formed of resin having higher elasticity than a metal. Thus, the vibration generated from the motor 1 can be reduced due to an internal loss of the resin material when the vibration transfers to the casing 3. In addition, the amplitude of the vibration generated from the motor 1 is reduced due to the internal loss of the resin material. Thus, the vibration can be attenuated in a shorter time. Furthermore, with the insulator 10, the noise generated from the motor 1 is less likely to be transferred. This makes it possible to achieve noise reduction of the motor 1.

In addition, the fixing part 15 illustrated in FIGS. 1 and 4 is, for example, a protruding part formed of resin. The first substrate 50 is fixed to the fixing part 15 in the axial direction.

The first conductive member 16 and the second conductive member 17 illustrated in FIGS. 1 and 4 are terminal pins used to handle the winding line that forms the coil 30. In the present embodiment, the motor 1 includes, for example, three first conductive members 16 and one second conductive member 17.

For example, winding starts of winding lines of COM, a U phase, a V phase, and a W phase are wound around the first conductive members 16, and the first conductive members 16 are fixed to the first substrate 50 through soldering. This enables the coil 30 and the first substrate 50 to be electrically connected.

Furthermore, a winding end of a wiring line of COM is wound around the second conductive member 17, and the second conductive member 17 includes a resin coating. The second conductive member 17 is fixed to the first substrate 50 through soldering. In addition, the first substrate 50 and the second substrate 60 are electrically connected through pins (conductive members) 51a of coupling members 51. Furthermore, the pins 51a of the plurality of coupling members 51 are electrically connected to the GND, Vdc, Vcc, and the like, and signals are transferred from an external device. This enables the coil 30, the first substrate 50, and the second substrate 60 to be electrically connected to each other.

In the present example, the first substrate 50 and the second substrate 60 are disposed so as to oppose to each other in the axial direction with a gap G1 being provided between the first substrate 50 and the second substrate 60, as illustrated in FIGS. 1 and 2. That is, the first substrate 50 and the second substrate 60 are spaced apart from each other in the axial direction.

As illustrated in FIGS. 1 and 2, the first substrate 50 includes the coupling members 51, and a first wire line 52. For example, each coupling member 51 is a member obtained by covering, with resin, the pin 51a (conductive member) electrically connecting the first substrate 50 and the second substrate 60. In the present embodiment, the first substrate 50 includes the five coupling members 51. The first wire line 52 is connected to a Hall sensor (not illustrated) provided at the rotor 40 side of the first substrate 50. In this manner, the first conductive member 16, the second conductive member 17, and the coupling members 51 including the pins 51a are used to fix the first substrate 50 and the second substrate 60, and to fix the insulator 10 to the first substrate 50 and the second substrate 60. This makes it possible to reduce structural elements of the motor 1.

A plurality of electronic components 61 are mounted at the second substrate 60. The electronic components 61 include, for example, a capacitor and an AC-DC converter but are not limited to these components. In addition, a second wire line 62 configured to supply power is connected to the second substrate 60.

As illustrated in FIG. 1, the electronic components 61 have a relatively large size, as compared with the size of the motor 1. In the present embodiment, the electronic components 61 are disposed at an upper side surface of the second substrate 60 in the axial direction, that is, at a surface disposed at an opposite side in the axial direction from a surface opposing to the first substrate 50 and the insulator 10. In other words, the electronic components 61 are disposed at a surface opposite in the axial direction from the output-side end part 82 of the shaft 80. This makes it possible to reduce the size or the diameter of the motor 1.

Figure 6:
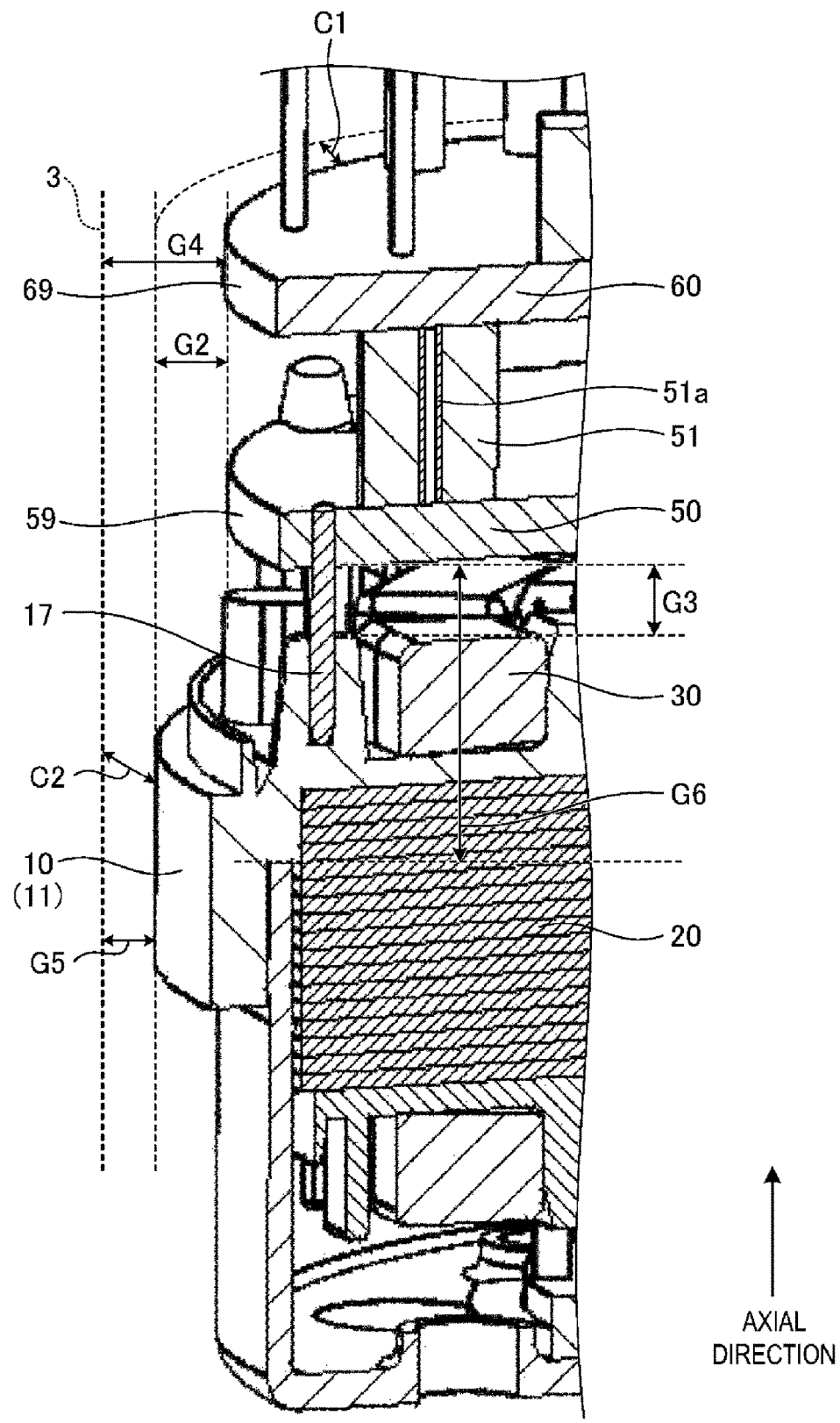
FIG. 6 is an enlarged cross-sectional view illustrating one example of the motor according to the first embodiment.

Furthermore, the sizes, in the radial direction, of the first substrate 50 and the second substrate 60 are formed so as to be smaller than the size, in the radial direction, of the outer circumference part 11 of the insulator 10. FIG. 6 is an enlarged cross-sectional view illustrating one example of the motor according to the first embodiment. FIG. 6 is an enlarged view of a part indicated by the area F in FIG. 2. As illustrated in FIG. 6, a gap G2 is formed between the outer circumference part 11 of the insulator 10 and the outer circumference part 59 of the first substrate 50 and between the outer circumference part 11 of the insulator 10 and the outer circumference part 69 of the second substrate 60. The gap G2 forms an annular space C1 surrounding the outer circumference part 59 of the first substrate 50 and the outer circumference part 69 of the second substrate 60. This makes it possible to prevent the casing 3 from being brought into contact with the first substrate 50 or the second substrate 60, thereby suppressing transfer of the vibration to the casing 3. Note that, an example has been described with reference to FIG. 6, and, in this example, the size, in the radial direction, of the first substrate 50 is substantially the same as the size, in the radial direction, of the second substrate 60. However, a configuration is not limited to this configuration, and it is only necessary that, in the radial direction, the outer circumference part 59 of the first substrate 50 and the outer circumference part 69 of the second substrate 60 be disposed at the inner side than the outer circumference part 11 of the insulator 10. In addition, a gap G4 between the inner surface of the casing 3 and the outer circumference part 59 of the first substrate 50 or the outer circumference part 69 of the second substrate 60 may be increased to increase the size of the annular space C1. Furthermore, it may be possible to provide a gap G5 between the inner surface of the casing 3 and the outer circumference part 11 of the insulator 10, provide a space C2 surrounding the outer circumference part 11 of the insulator 10 and including the gap G5, and form the space C2 largely. With these spaces being provided, air passing through the inside of the motor 1 including the coil 30 more easily flows. This makes it possible to suppress an increase in temperature of the motor 1.

In addition, as illustrated in FIG. 6, a gap G3 is formed between the first substrate 50 and other members of the motor 1. For example, the outer circumference part 59 of the first substrate 50 and the tubular part 79 of the metal housing 70 are spaced apart from each other with a gap G6 being provided between the outer circumference part 59 and the tubular part 79. This makes it possible to suppress transfer of the vibration of the motor 1 to the first substrate 50 or the second substrate 60.

The bearing housing 90 includes a pair of bearings 91 and 92. Each of the bearings 91 and 92 opposes to the shaft 80 in the radial direction. In the present embodiment, an end part 93 of the bearing housing 90 at the first substrate 50 side in the axial direction oppose s to the yoke 42 of the rotor 40 in the axial direction. In addition, the bearing housing 90 integrally holds the bearing 91 at the lower side in the axial direction and the bearing 92 at the upper side in the axial direction. This makes it possible to improve the accuracy of coaxiality of the bearing 91 at the lower side and the bearing 92 at the upper side, thereby achieving the increased service life of the motor 1.

Figure 7:
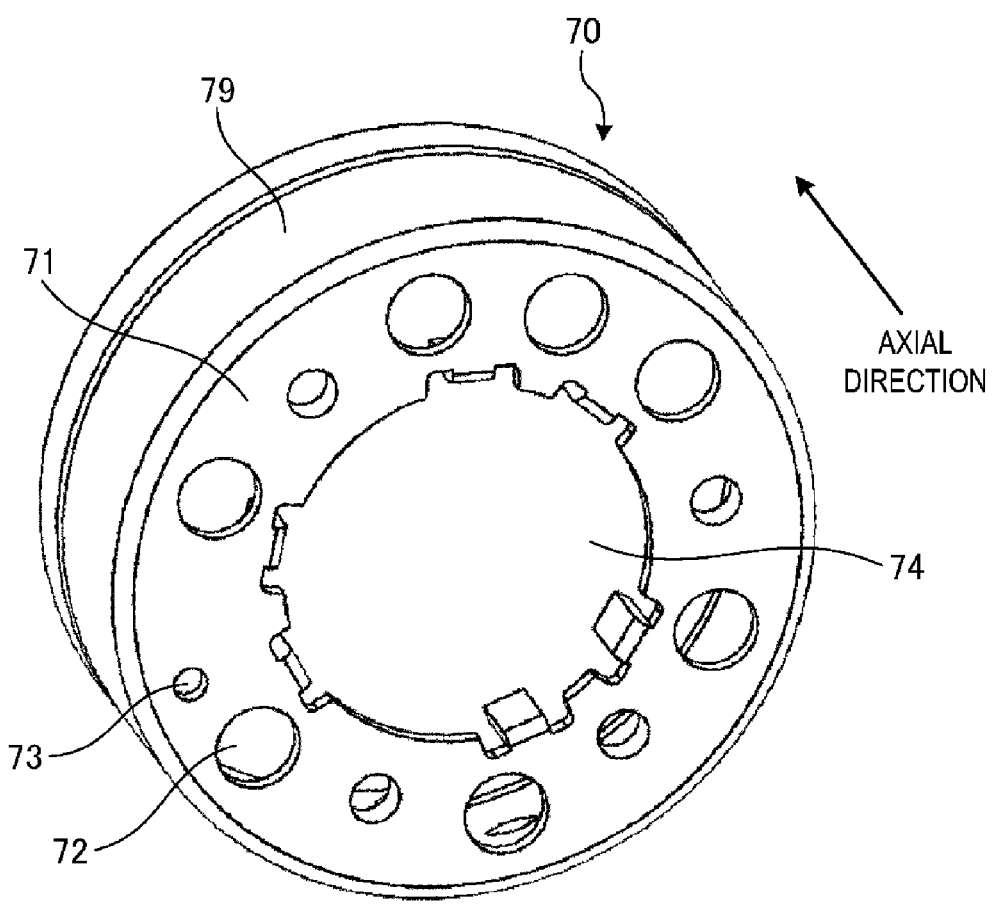
FIG. 7 is a perspective view illustrating one example of a housing according to the first embodiment.

FIG. 7 is a perspective view illustrating one example of the housing according to the first embodiment. As illustrated in FIGS. 5 and 7, the housing 70 includes the tubular part 79 and a bottom surface 71. The bottom surface 71 constitutes an end surface of the housing 70 at the lower side in the axial direction. An insertion hole 74 to allow the shaft 80 to be inserted is formed in the bottom surface 71. In addition, a plurality of hole parts 72 and a plurality of hole parts 73 are also formed in the bottom surface 71. In the present embodiment, the hole parts 72 are formed to have diameters larger than diameters of the hole parts 73. Note that the insertion hole 74 serves as one example of a first hole part. In addition, the hole parts 72 serve as one example of a second hole part, and the hole parts 73 serve as one example of a third hole part.

As illustrated in FIG. 5, the hole parts 72 are formed, for example, at positions opposing to the coil 30 in the axial direction. That is, the hole parts 72 are formed so that air flows inside the motor 1 including the coil 30. With the hole parts 72 being formed in the bottom surface 71 of the housing 70, it is possible to reduce the weight of the housing 70 and to suppress an increase in temperature of the motor 1, for example, due to self-heating of the coil 30 or heat transferred from the coil 30 to the stator core 20 or the rotor 40. That is, with the hole parts 72, it is possible to suppress demagnetization of the motor 1 at high temperatures, deterioration of a resin material of the insulator 10 due to heat generation, or the like, and it is also possible to achieve the weight reduction and the increased service life.

Furthermore, the hole parts 73 illustrated in FIG. 7 may be used, for example, as a positioning hole or screw hole used to attach the housing 70 to the insulator 10 or the first substrate 50. In this case, the hole parts 73 may be formed, for example, at positions opposing to the first substrate 50 in the axial direction. This makes it possible to improve an assembling accuracy of the motor 1, and also makes it possible to reduce assembling cost of the motor 1. Note that the housing 70 illustrated in FIG. 7 includes the seven hole parts 72 and the five hole parts 73. However, the numbers of the hole parts included in the housing 70 are not limited to these numbers.

As described above, the motor 1 according to the present embodiment includes the rotor 40, the stator 2, the first substrate 50, the second substrate 60, and the electronic components 61 arranged at the second substrate. The stator 2 includes the stator core 20, the insulator 10, and the coil 30 wound around the stator core via the insulator. The insulator 10 includes the coupling part 14 coupled to an external device. The first substrate 50 is fixed to the insulator 10. The second substrate 60 is fixed to the first substrate 50, and the first substrate 50 and the second substrate 60 are spaced apart from each other in the rotation axis direction of the rotor 40. With such a configuration, it is possible to achieve the weight reduction and the noise reduction.

The embodiment according to the present invention has been described above. However, the present invention is not limited by the embodiment described above. A configuration obtained by appropriately combining the above-mentioned constituent elements is also included in the present invention. In addition, a skilled person can further derive modification examples in an easy manner. Thus, a wide range of aspects of the present invention is not limited to the embodiment described above, and may be modified variously.

REFERENCE SIGNS LIST 1 motor, 2 stator, 3 body, 10 insulator, 11 outer circumference part, 12 connecting part, 13 internal circumference part, 14 coupling part, 15 fixing part, 16 first conductive member, 17 second conductive member, 18 lower insulator, 20 stator core, 21 teeth part, 22 core back, 30 coil, 40 rotor, 41 magnet, 42 yoke, 50 first substrate, 51 coupling member, 52 first wire line, 59 outer circumference part, 60 second substrate, 61 electronic component, 62 second wire line, 69 outer circumference part, 70 housing, 71 bottom surface, 72, 73 hole part, 74 insertion hole, 79 tubular part, 80 shaft, 90 bearing housing, 91, 92 bearing

The invention claimed is:
1. A motor, comprising:
 a rotor;
 a stator including a stator core, an insulator, and a coil wound around the stator core via the insulator;
 a first substrate;

a second substrate; and
an electronic component arranged at the second substrate, wherein
the insulator includes a coupling part,
the first substrate is fixed to the insulator,
the second substrate is fixed to the first substrate,
the first substrate and the second substrate are spaced apart in a rotation axis direction of the rotor, and
an annular space surrounding an outer circumference part of the first substrate and an outer circumference part of the second substrate is formed.

2. The motor according to claim 1, wherein
the second substrate is fixed to the first substrate via a coupling member, and
the first substrate and the second substrate are fixed to the insulator.

3. The motor according to claim 1, wherein
the insulator includes an internal circumference part, and an outer circumference part including the coupling part, and
the outer circumference part of the insulator includes a fixing part configured to fix the first substrate.

4. The motor according to claim 1, wherein
the insulator includes a first conductive member configured to electrically connect the coil and the first substrate, and
the first substrate is fixed to the insulator via the first conductive member.

5. The motor according to claim 1, comprising a coupling member, wherein
the coupling member includes a conductive member configured to electrically connect the coil, the first substrate, and the second substrate.

6. A motor comprising:
a rotor;
a stator including a stator core, an insulator, and a coil wound around the stator core via the insulator;
a first substrate;
a second substrate;
an electronic component arranged at the second substrate; and
a housing configured to accommodate a part of the stator, wherein
the insulator includes a coupling part,
the first substrate is fixed to the insulator,
the second substrate is fixed to the first substrate, and
the first substrate and the second substrate are spaced apart in a rotation axis direction of the rotor,
an entire outer circumference part of the first substrate and an entire outer circumference part of the second substrate are spaced apart from the housing in the rotation axis direction of the rotor.

7. The motor according to claim 6, wherein
an outer circumference part of the housing is disposed at a farther inner side than an outer circumference part of the insulator.

8. The motor according to claim 6, wherein
a first hole part and a plurality of second hole parts having a size differing from the first hole part are formed in a bottom surface of the housing, and
a shaft is inserted into the first hole.

9. The motor according to claim 8, wherein
a third hole part having a size smaller than the second hole parts is further formed in the bottom surface of the housing.

10. The motor according to claim 6, wherein
the second substrate is fixed to the first substrate via a coupling member, and
the first substrate and the second substrate are fixed to the insulator.

11. The motor according to claim 6, wherein
the insulator includes an internal circumference part, and an outer circumference part including the coupling part, and
the outer circumference part of the insulator includes a fixing part configured to fix the first substrate.

12. The motor according to claim 6, wherein
the insulator includes a first conductive member configured to electrically connect the coil and the first substrate, and
the first substrate is fixed to the insulator via the first conductive member.

13. The motor according to claim 6, comprising
a coupling member, wherein
the coupling member includes a conductive member configured to electrically connect the coil, the first substrate, and the second substrate.

14. A motor comprising:
a rotor;
a stator including a stator core, an insulator, and a coil wound around the stator core via the insulator;
a first substrate;
a second substrate; and
an electronic component arranged at the second substrate, wherein
the insulator includes a coupling part,
the first substrate is fixed to the insulator,
the second substrate is fixed to the first substrate, and
the first substrate and the second substrate are spaced apart in a rotation axis direction of the rotor,
in a radial direction, an outer circumference part of the first substrate and an outer circumference part of the second substrate are disposed at a farther inner side than an outer circumference part of the insulator.

15. The motor according to claim 14, wherein
the second substrate is fixed to the first substrate via a coupling member, and
the first substrate and the second substrate are fixed to the insulator.

16. The motor according to claim 14, wherein
the insulator includes an internal circumference part, and an outer circumference part including the coupling part, and
the outer circumference part of the insulator includes a fixing part configured to fix the first substrate.

17. The motor according to claim 14, wherein
the insulator includes a first conductive member configured to electrically connect the coil and the first substrate, and
the first substrate is fixed to the insulator via the first conductive member.

18. The motor according to claim 14, comprising
a coupling member, wherein
the coupling member includes a conductive member configured to electrically connect the coil, the first substrate, and the second substrate.

* * * * *